United States Patent
King et al.

(10) Patent No.: US 6,554,911 B1
(45) Date of Patent: Apr. 29, 2003

(54) EN MASSE PROCESS FOR CLEANING THIN POLARIZING GLASS DEVICES

(75) Inventors: Jeffrey M. King, Corning, NY (US); Leroy R. Morse, Campbell, NY (US); Hoa T. Dempsey, Corning, NY (US); Erika L. Stapleton, Lindley, NY (US)

(73) Assignee: Corning Incorporated, Corning, NY (US)

( * ) Notice: Subject to any disclaimer, the term of this patent is extended or adjusted under 35 U.S.C. 154(b) by 149 days.

(21) Appl. No.: 09/670,372

(22) Filed: Sep. 26, 2000

Related U.S. Application Data
(60) Provisional application No. 60/159,676, filed on Oct. 15, 1999.

(51) Int. Cl.$^7$ .................................................. B08B 3/00
(52) U.S. Cl. ............................... 134/26; 134/2; 134/10; 134/25.1; 134/34; 134/111; 210/222; 401/15
(58) Field of Search ........................... 134/1, 1.3, 2, 10, 134/12, 21, 25.1, 26, 36, 34, 111, 184; 2/181; 407/15; 15/104.93; 206/210; 210/222; 119/241

(56) References Cited

U.S. PATENT DOCUMENTS

| | | | | |
|---|---|---|---|---|
| 1,139,313 A | * | 5/1915 | Stevens ........................ 2/181 |
| 2,499,891 A | | 3/1950 | Wagner | |
| 3,664,354 A | | 5/1972 | Minbiole, Jr. et al. | |
| 3,807,954 A | * | 4/1974 | McDonald .................. 206/210 |
| 3,868,272 A | | 2/1975 | Tardoskegyi ................. 134/61 |
| 3,870,019 A | * | 3/1975 | McNicol ..................... 119/241 |
| 3,877,787 A | * | 4/1975 | Buzbee et al. .............. 350/105 |
| 3,887,497 A | * | 6/1975 | Ulvild ........................ 510/420 |
| 3,997,358 A | | 12/1976 | Taylor ......................... 134/26 |
| 4,049,585 A | * | 9/1977 | Heckert ...................... 252/531 |
| 4,187,868 A | | 2/1980 | Rudolphi .................... 134/184 |
| 4,226,548 A | * | 10/1980 | Reith ......................... 134/111 |
| 4,409,999 A | * | 10/1983 | Pedziwiatr .................. 134/184 |
| 4,426,311 A | | 1/1984 | Vander Mey ............... 252/143 |
| 4,648,925 A | | 3/1987 | Goepfert et al. ............ 156/153 |
| 4,672,984 A | * | 6/1987 | Ohhashi ..................... 134/184 |
| 4,722,295 A | | 2/1988 | Young ........................ 118/416 |
| 4,865,668 A | * | 9/1989 | Goepfert et al. ......... 15/104.93 |
| 5,002,794 A | * | 3/1991 | Ratner et al. ............... 427/488 |
| 5,350,489 A | * | 9/1994 | Muraoka .................... 156/651 |
| 5,453,132 A | | 9/1995 | Kowalchuk .................. 134/21 |
| 5,482,067 A | | 1/1996 | Wittrock et al. ............ 134/135 |
| 5,569,330 A | | 10/1996 | Schild et al. .................. 134/1 |
| 5,909,741 A | | 6/1999 | Ferrell ........................... 134/1 |
| 5,964,958 A | * | 10/1999 | Ferrell et al. ................. 134/21 |

* cited by examiner

Primary Examiner—Alexander Markoff
Assistant Examiner—Gentle Winter
(74) Attorney, Agent, or Firm—Timothy M. Schaeberle; Vincent T. Kung

(57) ABSTRACT

A method for en masse cleaning of thin polarizing glass devices involving the steps of using a cleaning vessel possessing a vertical side wall, and a porous shelf attached to the vertical side wall to form an annular cavity for receiving a plurality of the thin polarizing glass devices and, exposing the cleaning vessel containing the thin polarizing glass devices to washing, rinsing, drying steps to remove organic and inorganic matter from the surfaces of the polarizing glass devices.

40 Claims, 4 Drawing Sheets

EN MASSE PROCESS FOR CLEANING THIN POLARIZING GLASS DEVICES

CROSS REFERENCED TO RELATED APPLICATIONS

This application claims the benefit of U.S. Provisional Application Serial No. 60/159,676, filed Oct. 15, 1999 entitled EN MASSE PROCESS FOR CLEANING THIN POLARIZING GLASS DEVICE, of Jeff M. King, Leroy R. Morse, Hoa T. Nguyen and Erika L. Stapleton.

TECHNICAL FIELD

The present invention relates to a non-contact process for cleaning polarizing glass, and in particular to an en masse cleaning process suitable for the removal of organic and inorganic matter from thin polarizing glass devices having a thickness of between 10 $\mu$m to 50 $\mu$m.

BACKGROUND OF THE INVENTION

The thorough cleaning in the processing of polarizers or polarizing glass devices poses an especially difficult task in that such devices may be as small as 1.0 mm×2.0 mm×30–50 $\mu$m. Conventionally, the cleaning process of polarizers has been practiced primarily by manually washing each device individually.

An example of a polarizing glass, POLARCOR™ is available from Corning Incorporated, Corning, N.Y. POLARCOR™ products are available in thickness as low as 200 $\mu$m. Co.-pending U.S. application Ser. No. 09/142713 entitled "Ultrathin Glass Polarizers and Method of Making Same", having as inventors Borrelli et al., assigned to the instant assignee, and herein incorporated in its entirety by reference, discloses a process by which polarizing glass can be thinned further to form an ultrathin polarizing glass measuring less than 50 $\mu$m in thickness, preferably between about 10–40 $\mu$m.

During the thinning process the polarizing glass is blocked or bonded to a substrate with a suitable material such as a rosin or a wax, or a mixture of rosin and wax. The polarizing glass is thinned to the desired thickness, preferably about 30–50 $\mu$m, and thereafter sliced into wafers of about 1 mm×2 mm. Prior to packaging and delivery to the customer all organic matter, such as rosin, wax, and inorganic matter, such as polishing/grinding media, and glass chips from the slicing process, must be removed from the surface of the polarizing glass wafers.

Due to the small and delicate nature of these thin polarizing glass devices, effective cleaning treatments are limited. Typically, each thin polarizing glass wafer is washed manually one at a time, a process which is not only labor-intensive and inefficient, but also costly—costs which are ultimately translated to the end consumer. Further, since this manual process is a contact process, there is extensive manipulation of the devices, which increases the possibility of in-process damage and post-process contamination.

In view of the above-described disadvantages in the art, there exists an explicit need for a cost-efficient, expedient and high-volume process for cleaning thin polarizing glass devices.

SUMMARY OF THE INVENTION

Accordingly, it is an object of the present invention to eliminate the above-mentioned disadvantages by providing a thorough and highly efficient process for cleaning en masse thin polarizing glass devices. It is a still further object of the present invention to provide a cleaning process for thin polarizing glass devices that provides minimum in-process (e.g., scratching or breaking) and post-process damage (e.g., re-contamination). It is a still further object of the present invention to provide a cleaning process that is cost-efficient and transferable to large-scale production.

Other objects and advantages of the present invention will be apparent from the following description.

In accordance with the present invention, there is provided a method for en masse cleaning of polarizing glass devices including the steps of using a cleaning vessel having a porous shelf, and being capable of holding a high-volume of thin polarizing glass devices; and, exposing the cleaning vessel containing the polarizing glass devices to washing, rinsing and drying steps to remove organic and inorganic matter from the surfaces of the polarizing glass devices. As used herein the term "en masse" means that the polarizing devices are cleaned all at once and together.

In particular the inventive method comprises the following specific steps:

providing a cleaning vessel possessing a vertical side wall and a porous shelf secured to said vertical side to form an annular cavity for containing a plurality of thin polarizing glass devices;

loading said polarizing glass devices into said cleaning device;

washing the polarizing glass devices contained in the cleaning vessel in an organic solvent;

washing the polarizing glass devices contained in the cleaning vessel in aqueous-based detergent;

rinsing the polarizing glass devices contained in the cleaning vessel in a first rinse of high-purity water;

rinsing the polarizing glass devices contained in the cleaning vessel in a dilute mineral acid rinse;

rinsing the polarizing glass devices contained in the cleaning vessel in a second rinse of high-purity water;

drying the polarizing glass devices contained in the cleaning vessel in an oven; and, unloading the polarizing glass devices from the cleaning vessel.

The present invention is also related to a vessel capable of cleaning a high-volume of thin polarizing glass devices comprising:

a vertical side wall; and, a porous shelf attached to the vertical side wall, such that an annular cavity is formed for receiving a plurality of said polarizing glass devices.

BRIEF DESCRIPTION OF THE DRAWINGS

The invention will be further described in conjunction with the attached drawings in which.

The accompanying drawings are included to provide a further understanding of the invention and are incorporated in and constitute a part of this specification, illustrate one embodiment of the invention and together with the description serve to explain the principles of the invention. It is to be understood that various elements of the drawings are not intended to be drawn to scale, but instead are sometimes purposely distorted for the purposes of illustrating the invention.

DETAILED DESCRIPTION OF THE PREFERRED EMBODIMENTS

Figure 1:
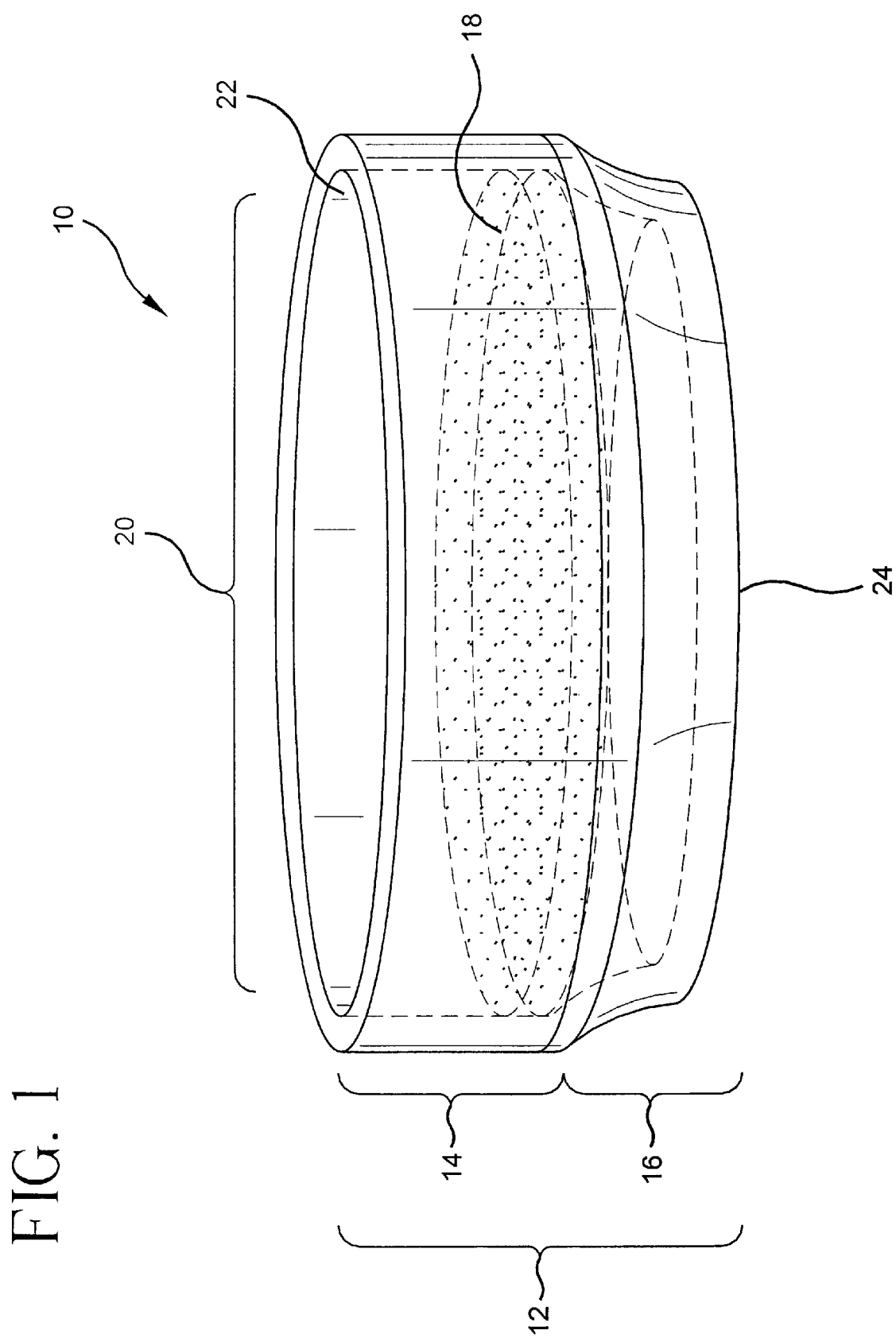
FIG. 1 is a perspective view of an embodiment of a cleaning vessel of the present invention.

Referring now to FIG. 1 therein illustrated is an embodiment of a cleaning vessel suitable for use in the cleaning process of the present invention. Cleaning vessel 10 comprises a vertical side wall 12 having a first portion 14 and a second tapered portion 16. Vessel 10 further comprises shelf 18. Shelf 18 is secured to first portion 14 of vertical side wall 12 to form annular cavity 20 for containing a plurality (high-volume) of polarizers or polarizing glass wafers. Cleaning vessel 10 has an open top 22 and an open bottom 24. Vertical side wall 12 is made of glass, preferably borosilicate.

Shelf 18 is made of a material that is porous. In the embodiment of FIG. 1, shelf 18 is made of partially fused glass frit formed into a disc, about 4 mm thick, via artknown hot glass-working methods. The porous structure is a result of the fritted glass being fused only partially such that melting of the glass does not occur. The term "porous" as used in the present invention to describe the shelf refers to a structure that will allow cleaning fluids to pass through and flow away after coming into contact with the polarizer devices.

In a preferred embodiment cleaning vessel 10 is made by cutting the top and bottom ends of a standard commercially available Buchner funnel, made of borosilicate glass, to form vertical side wall 12. Porous shelf 18 is secured to first portion 14 vertical side wall 12 by glass fusion during fabrication the original Buchner funnel.

Figure 2:
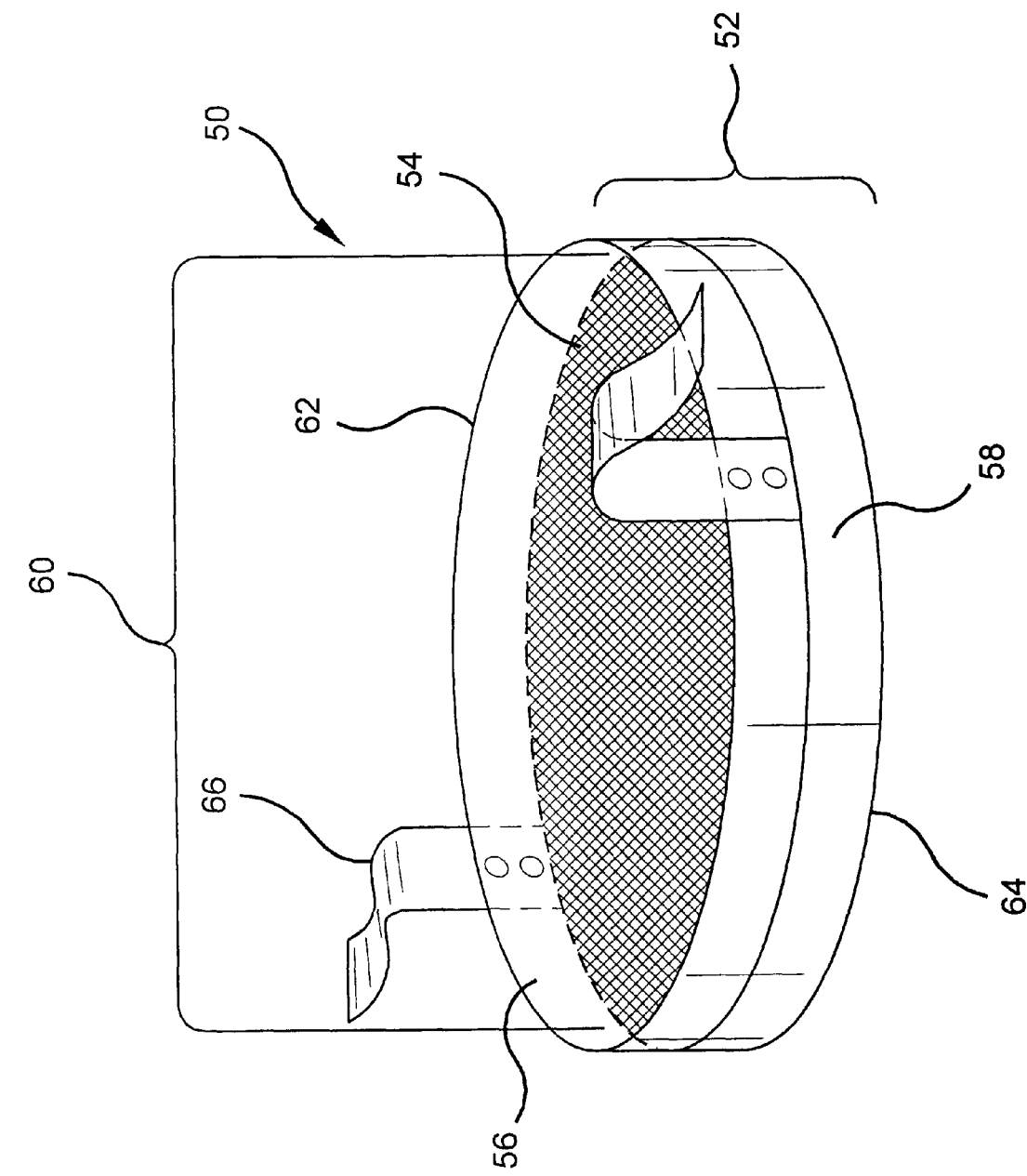
FIG. 2 is a perspective view of another embodiment of a cleaning vessel suitable of the present invention.

Referring now to FIG. 2 therein illustrated is another embodiment of a cleaning vessel suitable for used in the present inventive high-volume cleaning process. Cleaning device 50 comprises a vertical side wall 52 having an inner side 56 and an outer side 58. Cleaning device 50 further comprises porous shelf 54 attached to inner side 56 of vertical side wall 52 to form annular cavity 60 for containing a plurality or high-volume of polarizing glass devices. Cleaning device 50 has an open top 62 and an open bottom 64. Vertical side wall 52 is made of a metal, preferably stainless steel. Porous shelf 54 is made of a meshed material, preferably polypropylene mesh. The mesh openings are smaller in size than the polarizing glass devices, but large enough to allow the cleaning media to pass through, preferably 710 μm in size. Handles 66 are attached to outer side 58 of vertical wall 52 to provide ease of handling.

A key aspect of the present invention is that the process is carried out en masse, i.e., all at once and together, with little or no handling or manipulation of individual pieces. Hence the inventive process is non-contact.

Another key aspect of the present invention is that all sides of polarizers devices are either directly or indirectly accessible to the cleaning media at all steps of the process. More specifically, the structure of the shelf, i.e., the shelf is porous, allows cleaning solutions and media to reach the tops as well as the bottoms, i.e., all sides, of polarizers devices.

Still another key aspect of the present invention is that the cleaning vessel is itself exposed to all steps of the inventive cleaning process. As such the cleaning vessel must be constructed of a material that is as resistant if not more resistant than the polarizers contained therein, to cleaning solutions and media. The vessel must be able to withstand a wide variety of chemical and physical exposures including chemical treatments and corrosion, in addition to heating and agitation associated with such treatments. Suitable materials for the cleaning vessel include glass (e.g., borosilicate), ceramic (e.g., alumina), noble metals (e.g., platinum, rhodium, and gold), ferrous and non-ferrous metals including stainless steels, and carbonaceous materials (e.g., graphitic or glassy carbon).

The cleaning vessel containing polarizers is preferably passed from station to station during the cleaning process. Alternatively, the vessel containing the polarizing devices to be cleaned can be retained in one single location or station throughout all steps, whereby the different cleaning media are passed through the vessel itself. For example, cleaning fluids can be poured into and drained from or pumped through or drawn though the vessel with a vacuum pump from above or below as desired.

Figure 3:
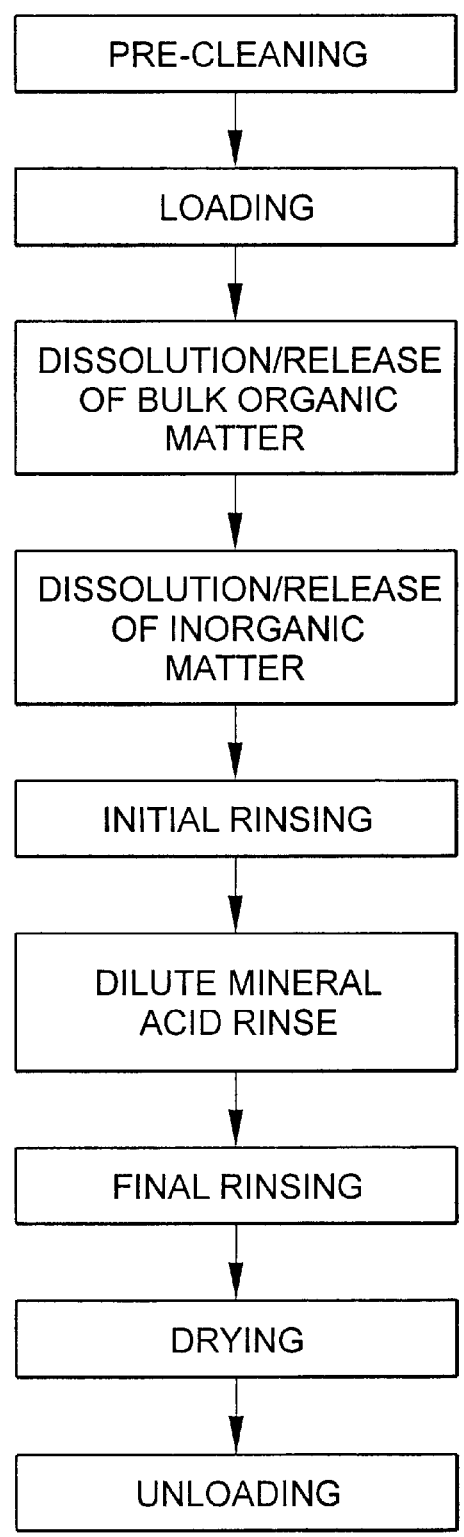
FIG. 3 shows schematically an embodiment of the cleaning process of the present invention.

In an embodiment the cleaning process comprises the following steps. (See FIG. 3)

Pre-Cleaning.

In this preliminary and preparatory step, a pallet containing a strip of polarizing glass devices bonded to a glass substrate is immersed and soaked in a aqueous-detergent bath to remove the bulk of dirt from polishing, slicing and handling. Ultrasonic agitation may be used in this step to enhance cleaning.

As used herein a "pallet" contains a strip of POLARCOR™ glass thinned to a desired thickness, 30–50 μm, and sliced into wafers, having dimensions of 1 mm×2 mm, as described in Co.-pending U.S. application Ser. No. 09/142713 entitled "Ultra-Thin Glass Polarizers and Method of Making Same", having as inventors Borrelli et al., assigned to the instant assignee, and herein incorporated in its entirety by reference.

Loading.

The pallet is immersed in a first soak of organic solvent to release the individual polarizer devices from the pallet. A suitable solvent is one that allows for the dissolution of the bond between the polarizers and the glass substrate. An example of is En Solv-CW manufactured by Enviro Tech International Inc., Melrose Park, Ill. The solvent is at an elevated temperature, preferably 50° C.

This step is carried out over the cleaning vessel such that upon release, the polarizers fall directly onto the porous shelf, and hence are loaded into the cleaning vessel. Handling of the polarizers is eliminated, which significantly reduces damage caused by breakage. Each polarizer device is substantially accessible equally on all sides, i.e., top, bottom and edges, by the cleaning media at each step.

Dissolution/Release of Bulk Organic Matter.

In this step the vessel and the polarizers are immersed in a second soak of organic solvent that is selected for its ability to dissolve organic matter, such as resin, wax, grease, fingerprints, from the surface of the polarizers, while concurrently releasing any organic-imbedded inorganic matter, such as glass chips and polishing/grinding media. Suitable organic solvents include 1,1,1-trichloroethane and 1 bromopropane with 1 bromopropane being the preferred choice.

This step is carried out at elevated temperatures, of about 40–60° C., preferably about 50° C.

Ultrasonic agitation, as known in the art, is preferred for a portion of the soaking to enhance and expedite the desired effects, mainly the release of organic matter from the surfaces of the polarizers and from between any over-lapping polarizers.

Dissolution/Release of Inorganic Matter.

In this step the polarizers are washed with three successive soaks of an aqueous-based detergent selected for its ability to dissolve and release inorganic matter, such as polishing/grinding media, glass chips, and any remaining traces of organic matter. A suitable detergent has a high pH (about 12) and high alkaline content, such as Valtron® SP2200, manufactured by Valtech Corporation, Pughtown, Pa.

This step is conducted at elevated temperatures of 40–70° C., preferably at about 65–70° C. Conventional ultrasonic agitation is used in the second soak to intensify the cleaning.

Initial Rinsing.

In this step the polarizers in the vessel are rinsed with a first rinse of fresh, high purity water preferably at a temperature of 40–70° C., preferably 65–70° C., to remove accumulated cleaning media from the previous steps, especially from the detergent soaks.

Dilute Mineral Acid Rinse.

In this step the vessel and polarizers are immersed in a mineral acid rinse to ensure complete removal of the aqueous-based detergent. Suitable acids will be the volatile mineral acids such as hydrochloric and nitric acid, preferably 0.02N hydrochloric acid.

Final Rinsing.

In this step the vessel and polarizers are immersed in three successive soaks of high purity water at elevated temperatures of 40–70° C., preferably 65–70° C., to remove the mineral acid solution of the previous step and any remaining residues. Preferably, the first soak is intensified with ultrasonic agitation.

Drying.

In this step the polarizers in the vessel are dried in an oven heated at temperatures of about 50–115°C., preferably about 50° C.

Unloading.

After drying the polarizing glass devices are unloaded from the cleaning vessel, inspected and packaged in storage containers, accordingly.

Figure 4:
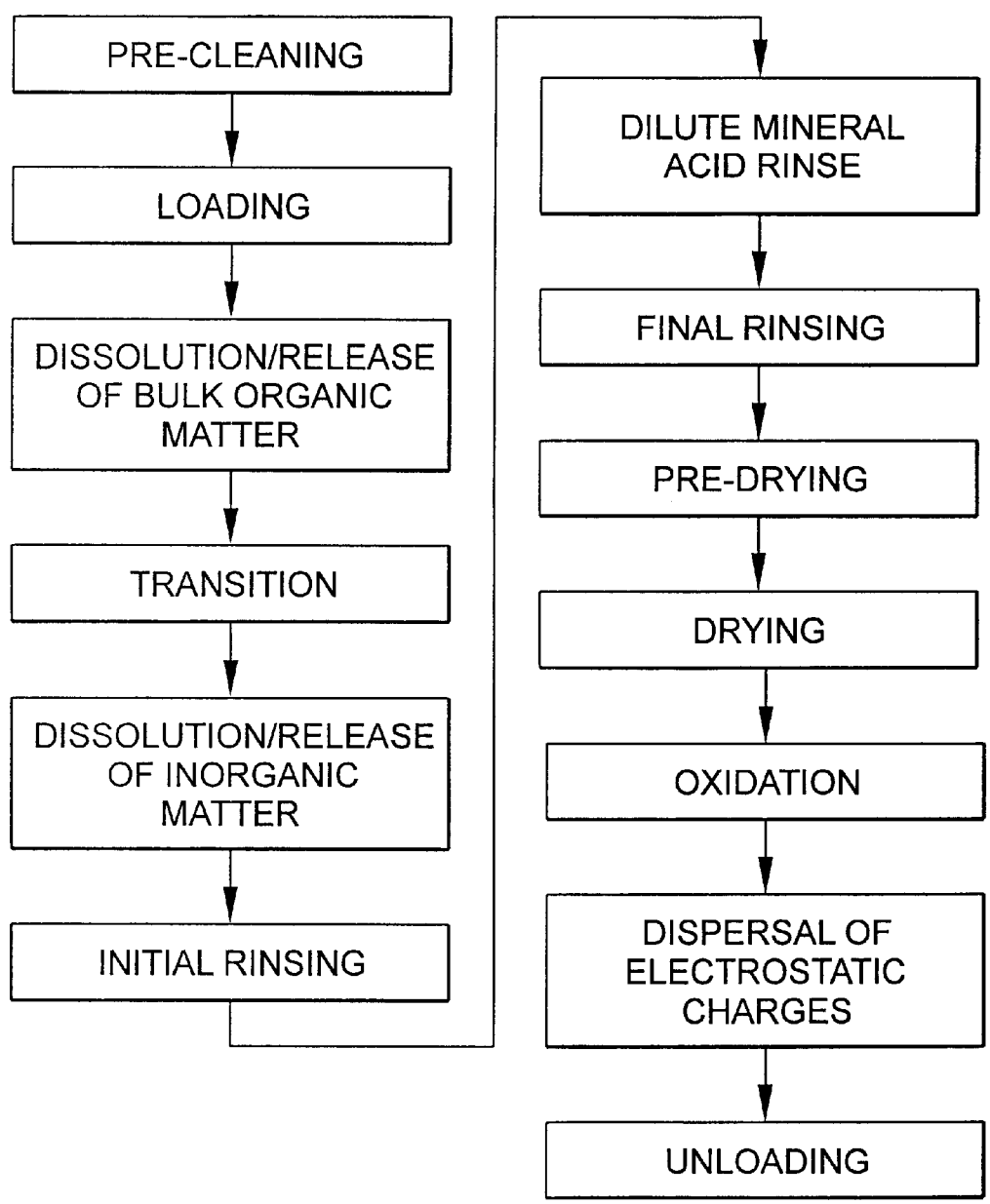
FIG. 4 shows schematically another embodiment of the cleaning process of the present invention.

In another embodiment of the inventive cleaning process, the following steps are added to the process described above. (See FIG. 4)

First, a "transition" step is added, in which the polarizers in the vessel are exposed to a transition agent which may aid in the transition from the organic medium of the "dissolution/release of organic matter" step to the aqueous-detergent medium of "dissolution/release of inorganic matter" step, by maintaining a lowered contact angle the polarizers and the aqueous-detergent medium. Examples of suitable transition agents include acetone and isopropyl alcohol. The transition agent may also aid the polarizers in sinking into the aqueous-detergent medium and not suspending at to the top due to surface tension.

Second, a "pre-drying" step is added, in which the polarizers in the vessel are dipped in a bath of fresh, high purity isopropyl alcohol which may enhance the removal of water residue from the "final rinsing" step, such as to circumvent possible water-spotting on the surfaces of polarizers. In this step, isopropyl alcohol is used as a drying agent to absorb the water from the surface of the polarizers. Isopropyl alcohol is miscible with water and acts to desiccate the water from the glass surface. The isopropyl alcohol may be warmed for better effects.

Third, an "oxidation" step is added to follow the "drying" step. In this step the polarizers are exposed to an UV-ozone device or more preferably, an art-known oxygen-plasma device to remove any possible lingering traces of organic residue surviving the preceding steps.

Fourth, following the "oxidation" step the polarizers would be exposed to a humid or ionizing environment to disperse any possible electrostatic charges which may have accumulated on the devices during the preceding oxidation step. Such electrostatic charges could lead to recontamination or cause difficulty in the manipulation of the components during any subsequent inspection, transfer to storage containers or further processing.

The following nonlimiting examples are presented to better illustrate the present invention.

The inventive high-volume cleaning process has been successfully employed in laboratory experiments as illustrated below.

EXAMPLE 1

A pallet containing about 1000 polarizing glass devices was placed over the cleaning vessel of FIGS. 2 and 2A. The cleaning vessel was placed in a laboratory beaker a little larger than cleaning vessel, which contained a solution of En-Solv CW, at 50° C. The pallet was soaked for 5 minutes to allow the polarizers to be released. As the bond between the polarizers and the glass substrate was disrupted, the devices fell onto the shelf of the cleaning vessel.

Thereafter, cleaning vessel containing the polarizers was immersed in a second, fresh soak of En-Solv CW organic solvent from dissolution and release of organic matter from the surface of the glass polarizers. The soak, was in a beaker containing about 700 ml of fluid at a temperature of 50° C. and was static for 10 minutes followed by 5 minutes of a conventional ultrasonic agitation cycle.

Next, the cleaning vessel and the polarizers were immersed in three successive soaks of 2% v/v Valtron SP2200 detergent for dissolution/release of inorganic matter. The first soak was in 700 ml of fluid at 65–70° C., statically for 5 minutes. The second soak was in 700 ml of fluid at 65–70° C., statically for 25 minutes followed by 5 minutes of ultrasonic agitation. The third soak was in 350 ml of fluid at 65–70° C., statically for 5 minutes.

Next, the vessel and the polarizers are rinsed in about 700 ml of high purity water at 65–70° C., statically for 5 minutes. Transfer is then made to a bath of 200 ml of 0.02N hydrochloric acid where the vessel and the polarizers are soaked statically for 5 minutes.

Next, the vessel and the polarizers are immersed in three successive soaks of high purity water. The first soak was in 700 ml of fluid at 65–70° C., statically for 10 minutes followed by a 5 minute ultrasonic cycle. The second soak was in 700 ml of fluid at 65–70° C., statically for 15 minutes. The third soak was in 700 ml of fluid at 65–70° C., statically for 15 minutes.

Transfer was then made to an oven heated at 50° C., where the polarizers are dried for one hour.

Inspection of the polarizing glass devices resulted in about 98% selects, an increase of about 30% over art-practiced contact, manual processes.

EXAMPLE 2

About 450 polarizing glass optical components, having dimensions of 1.0 mm×2.0 mm×30–50 µm were placed in a cleaning vessel as shown in FIGS. 1 and 1A.

The vessel with the polarizers(hereinafter referred to as the vessel) were placed into and filled with isopropyl alcohol, and allowed to soak at room temperature in a static condition, i.e., there was no agitation, for about 30 minutes. Thereafter, the vessel was removed from the isopropyl alcohol and drained by gravity.

Next, the vessel was placed into and filled with 1,1,1-trichloroethane at 50° C., soaked statically for 10 minutes, followed by ultrasonic agitation for 5 minutes. A static soaking in acetone at room temperature for about 15 minutes followed.

After the vessel was removed from and drained of the acetone, it was placed into and filled with a 2% solution of CA-05 detergent manufactured by SPC Electronics America, Inc., Norcross, Ga. at 50° C., soaked statically for 10 minutes, followed by ultrasonic agitation for 5 minutes. Thereafter, the vessel was removed from the detergent solution, drained and placed into and filled with deionized water at 50° C., soaked statically for 10 minutes, followed by ultrasonic agitation for 5 minutes. The same procedure was repeated with a second charge of deionized water.

Thereafter, the vessel was removed from and drained of the deionized water and placed into and filled with 0.02N hydrochloric acid (i.e., 1% hydrochloric acid) at room temperature and soaked statically. After 5 minutes the vessel was removed from and drained of the hydrochloric acid, placed into deionized water at 50° C., and agitated ultrasonically for 5 minutes.

Next, the vessel was placed into and filled with isopropyl alcohol at 50° C. and allowed to soak at about 50° C. in static condition for about 15 minutes. After this soaking the vessel was removed from and drained of the isopropyl alcohol and a vacuum was drawn on the vessel to remove any remaining alcohol.

Thereafter, the vessel was transferred to an oven heated to a temperature of about 100–115° C. The oven was vented and slowly raised to the desired temperature to preclude ignition of any lingering isopropyl alcohol.

Next an oxidation step was performed in an oxygen-plasma chamber and where the vessel was treated at 200 watts for 10 minutes. Next, the vessel were placed in a humidor at 53% relative humidity for several hours for dispersal of any electrostatic changes.

In laboratory experiments surprisingly smooth surfaces, i.e., average roughness of<1 nm, were obtained. While not intending to be limited by theory, this may be a result of lack of hard contact between the polarizers and the surface of the shelf. It is believed that due to the small mass of the polarizers, and the fact that cleaning solutions can reach all sides of the devices, a thin fluid film separates each polarizer from attaining intimate contact with the pressed fritted glass and hence the polarizers are retained in a suspended state, such that little or no scratching or damaging of the surface occurs.

It was found that the cleaning inventive process was at least 3 times as fast as the art-practiced, manual contact process. Further, selects improved about 30% over the art-practiced, manual contact process. Therefore, advantages of the present invention include short process and exceptionally good selects.

Although the present invention has been fully described by way of examples with reference to the accompanying drawings, it is to be noted that various changes and modifications will be apparent to those skilled in the art. In particular, the treatment conditions of time, temperature and agitation are mutually related in that, comparable good cleaning can be attained by, for example, decreasing time while increasing temperature and/or agitation. Therefore, unless otherwise such changes and modifications depart from the scope of the present invention, they should be construed as included therein.

What is claimed is:

1. A method for chemically cleaning en masse thin polarizing glass devices comprising the steps of:

providing a cleaning vessel possessing a vertical side wall and a porous shelf secured to said vertical side to form a cavity for containing a plurality of polarizing glass devices;

loading said polarizing glass devices into said cleaning vessel;

washing said polarizing glass devices contained in said cleaning vessel in an organic solvent;

washing said polarizing glass devices contained in said cleaning vessel in aqueous-based detergent;

rinsing said polarizing glass devices contained in said cleaning vessel in a first rinse of high-purity water;

rinsing said polarizing glass devices contained in said cleaning vessel in a dilute mineral acid rinse;

rinsing said polarizing glass devices contained in said cleaning vessel in a second rinse of high-purity water;

drying said polarizing glass devices contained in said cleaning vessel in an oven; and, unloading said polarizing glass devices from said cleaning vessel.

2. The method of claim 1, further comprising the step of exposing said polarizing glass devices in said cleaning vessel to a transition agent after said washing step in said organic solvent.

3. The method of claim 1, further comprising the steps of:

exposing said polarizing glass devices contained in said cleaning vessel to an oxygen-rich atmosphere, and exposing said polarizing glass devices contained in said cleaning vessel to a humid environment, wherein said further steps are done preceding said unloading of said polarizing glass devices from said cleaning device.

4. The method of claim 1, wherein said washing step with said organic solvent is accomplished with an organic solvent soak.

5. The method of claim 4, wherein said organic solvent is 1-bromopropane.

6. The method of claim 4, wherein said organic solvent soak is at a temperature of about 50° C.

7. The method of claim 6, wherein in a second organic solvent soak, said polarizing glass devices contained in said cleaning vessel are maintained in contact with said organic solvent for about 10 minutes, followed by about 5 minutes of ultrasonic agitation.

8. A method for removing organic and inorganic material from polarizing glass devices en masse, the method comprising the steps of:

a) providing a cleaning vessel having a cavity and a porous support for holding said glass devices;

b) washing said glass devices with an organic solvent in said cleaning vessel;

c) washing said glass devices with an aqueous detergent;

d) rinsing said glass devices with a first rinse of high-purity water;

e) rinsing said glass devices with a dilute mineral acid rinse; and f) rinsing said glass devices with a second rinse of high-purity water.

9. The method according to claim 8, wherein said method further comprises drying said glass devices at an elevated temperature; and, unloading said glass devices from said cleaning vessel.

10. At The method according to claim 8, wherein said method further comprises exposing said glass devices to a transition agent after said washing step in organic solvent.

11. The method according to claim 8, wherein said method further comprises dipping said glass devices in a bath of a drying agent to absorb water from a surface of said glass devices.

12. The method according to claim 8, wherein said method further comprises exposing said glass devices to an oxidizing atmosphere.

13. The method according to claim 8, wherein said method further comprises exposing said glass devices to either a humid or ionizing environment prior to said unloading step.

14. The method according to claim 8, wherein said glass devices have dimensions of about 1 mm×2 mm×30–50 μm.

15. The method according to claim 8, wherein said organic solvent includes 1,1,1-trichloroethane and 1-bromopropane.

16. The method according to claim 8, wherein said organic solvent is at an elevated temperature.

17. The method according to claim 16, wherein said organic solvent is at a temperature of about 40–60° C.

18. The method according to claim 8, wherein said organic solvent is subject to ultrasonic agitation for a portion of said washing step.

19. The method according to claim 8, wherein said aqueous detergent has an alkaline pH.

20. The method according to claim 19, wherein said aqueous detergent has a pH of about 12.

21. The method according to claim 8, wherein said washing step with said aqueous detergent is accomplished with three successive detergent soaks.

22. The method according to claim 21, wherein said detergent soaks are at an elevated temperature of about 40–70° C.

23. The method according to claim 22, wherein said detergent soaks are at an elevated temperature of about 65–70° C.

24. The method according to claim 21, wherein in a first detergent soak, said glass devices contained in said cleaning vessel are maintained in static contact with said detergent for about 25 minutes, followed by about 5 minutes of ultrasonic agitation.

25. The method according to claim 21, wherein in a second and a third detergent soak, respectively, said glass devices contained in said cleaning vessel are maintained in static contact with said detergent for about 5.

26. The method according to claim 8, wherein said dilute mineral acid rinse includes hydrochloric acid.

27. The method according to claim 8, wherein said dilute mineral acid rinse includes nitric acid.

28. The method according to claim 8, wherein said rinsing step with said second rinse of high-purity water is accomplished with three successive soaks of high-purity water.

29. The method according to claim 28, wherein said soaks of high-purity water soaks are at an elevated temperature of about 40–70° C.

30. The method according to claims 29, wherein said soaks of high-purity water soaks are at an elevated temperature of about 65–70° C.

31. The method according to claim 28, wherein in a first soak of high-purity water, said glass devices contained in said cleaning vessel are maintained in static contact with said high-purity water for about 10 minutes, followed by 5 minutes of ultrasonic agitation.

32. The method according to claim 28, wherein in a second and a third soak of high purity water, said glass devices contained in said cleaning vessel are maintained in static contact with said detergent for about 15, each.

33. The method according to claim 9, where said drying step is carried out in an oven at a temperature of about 50–115° C. for 1 hour.

34. The method according to claim 10, wherein said transition agent is acetone, and said glass devices contained in said cleaning vessel are maintained in contact with said acetone for about 15 minutes.

35. The method according to claim 8, wherein said cleaning vessel is made of a glass or ceramic.

36. The method according to claim 8, wherein said cleaning vessel is made of a metal or carbonaceous materials.

37. The method according to claim 8, wherein said porous support is made of a meshed material.

38. The method according to claim 8, wherein openings in said porous support are smaller in size than the glass devices, but large enough to allow cleaning media to pass through.

39. The method according to claim 38, wherein said openings have a size of about 710 μm.

40. The method according to claim 8, wherein said porous support is made of partially fused glass frit.

* * * * *